United States Patent [19]

Lenz

[11] 4,098,500

[45] Jul. 4, 1978

[54] ADJUSTABLE MEMBER FOR REDUCING CLAMP LOAD LOSSES IN A LOCKING JAW VISE

[75] Inventor: John O. Lenz, Coon Rapids, Minn.

[73] Assignee: Kurt Manufacturing Company, Inc., Minneapolis, Minn.

[21] Appl. No.: 855,019

[22] Filed: Nov. 25, 1977

[51] Int. Cl.$^2$ .............................................. B23Q 3/02

[52] U.S. Cl. .................................... 269/136; 269/244

[58] Field of Search ............................... 269/134–138, 269/244, 240, 241

[56] References Cited

U.S. PATENT DOCUMENTS

| | | | |
|---|---|---|---|
| 2,880,638 | 4/1959 | Muggli et al. | 269/241 |
| 3,397,880 | 8/1968 | Kuban | 269/240 |
| 4,043,547 | 8/1977 | Glomb et al. | 269/244 |

*Primary Examiner*—Robert C. Watson
*Attorney, Agent, or Firm*—Kinney, Lange, Westman and Fairbairn

[57] ABSTRACT

A locking jaw machine vise which includes a fixed jaw rigidly mounted on a frame, and a movable jaw slidably mounted on ways or guides for movement toward and away from the fixed jaw. The sliding jaw is driven by an actuating nut and screw. The actuating nut has an inclined surface that interlocks with the sliding jaw to provide a downward force on the sliding jaw to prevent the sliding jaw from tilting when it is clamped. A set screw is provided on the device to limit the amount of movement of the movable jaw toward the actuating nut to minimize any tendency of the jaw and the nut to bind on the ways or guides used for the sliding jaw.

4 Claims, 3 Drawing Figures

ADJUSTABLE MEMBER FOR REDUCING CLAMP LOAD LOSSES IN A LOCKING JAW VISE

BACKGROUND OF THE INVENTION

1. Field of the Invention

This invention relates to machine vises which utilize movable jaws that are actuated in a manner to permit the movable jaw to align properly with the workpiece while it is clamped.

2. Prior Art

U.S. Pat. No. 3,397,880 issued to W. G. Kuban, and U.S. Pat. No. 2,880,638 issued to L. A. Muggli et al. illustrate vise clamps which have movable jaws that are self-aligning and will clamp onto objects positively along the full depth of the vise jaws.

In the operation of these devices, the jaw nut exerts a downward force tending to urge the movable jaw toward the vise bed or frame and against the guiderails for the sliding jaw.

SUMMARY OF THE INVENTION

The present invention relates to the addition of an adjustable stop member for mechanically limiting the amount that a vise jaw adjustment nut and the actuated jaw can be moved toward each other. The stop member reduces the tendency of the jaw nut and sliding jaw to clamp together and bind onto the guides or ways for the sliding jaw of a vise and to thereby reduce friction losses in the vise during the clamping action. A greater proportion of the force generated by the jaw clamp screw is available for clamping of a workpiece in the jaws of the vise.

DESCRIPTION OF THE PREFERRED EMBODIMENT

Figure 1:
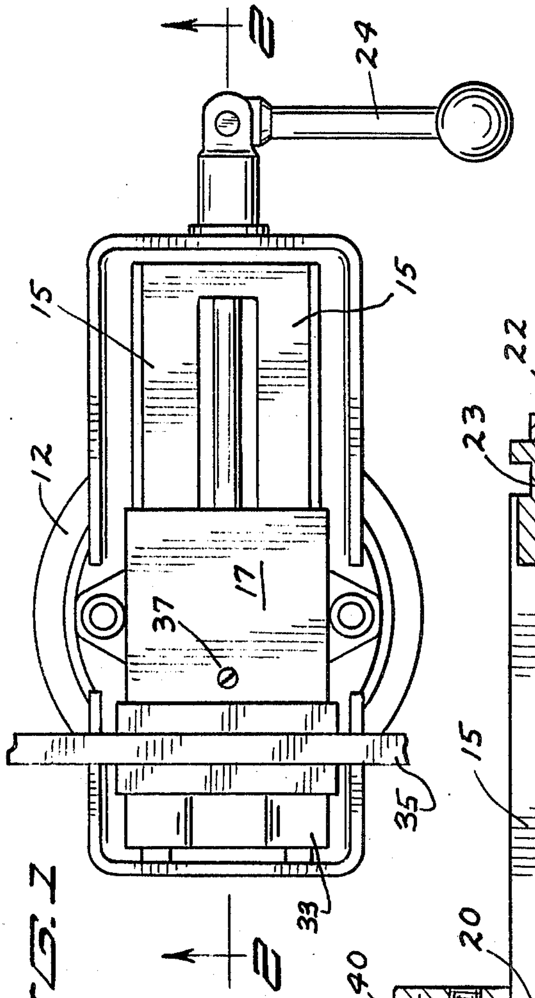
FIG. 1 is a top plan view of a machine vise made according to the present invention.

A movable jaw vise indicated generally at 10 has a main frame 11 that is adapted to be mounted in a suitable manner onto a support indicated generally at 12. The main frame 11 includes a base wall member 13, and side wall members 14,14 that are spaced apart and attached to opposite side edges of the base wall 13. The upper edge of walls 14 have inwardly directed ways or guide portions 15,15 extending toward each other from the side walls 14. The guide portions 15 are spaced from the upper surface of the base 13. The space indicated generally at 16 defined below the ways 15,15 and between the interior surface of the side walls 14,14 slidably receives a movable jaw actuating nut 17.

The nut 17 includes a threaded center opening indicated generally at 20 through which an actuating screw 21 of suitable design is threadably mounted. The actuating screw in turn is rotatably mounted as at 22 with respect to an upright end block 23, and the outer end of the screw includes a manual tightening handle 24 as shown. The ways 15,15 extend in direction along the length of the vise bed, and as shown the ways are spaced apart and a boss member 17A on the nut 17 protrudes between the ways.

The upper surface of the ways 15,15 form sliding guide surfaces for a movable jaw 25. The movable jaw 25 is constructed in the manner shown in U.S. Pat. No. 3,397,880, and has an interior receptacle indicated generally at 26 (see FIG. 2) that receives an upright projecting portion 17B of the actuating nut 17. The projecting portion 17B of the nut as shown has a forwardly directed downwardly inclined surface 30, that carries a part spherical washer assembly 31, which in turn seats into a receptacle in an upwardly and rearwardly facing surface 32 on the interior of the receptacle 26 of the movable jaw 25.

A stationary jaw 33 is provided at the opposite end of the vise bed or frame from the upright portion 23, and is fixed to the vise frame in a suitable manner.

It can be seen that when the screw 21 is rotated to move the nut 17 forwardly or toward the fixed jaw plate 33, the force from the nut will act through the part spherical washer 31 against the surface 30 on the movable jaw 25 and cause the movable jaw to move toward the stationary jaw. The force also will tend to move the movable jaw downwardly toward the upper surfaces of the ways or guides 15. In certain instances, therefore, the reaction between the movable jaw and the nut will tend to clamp the ways 15 between these two members because of the reactive force between the two resulting from the angle through which the force is transmitted from the nut to the jaw.

Figure 2:
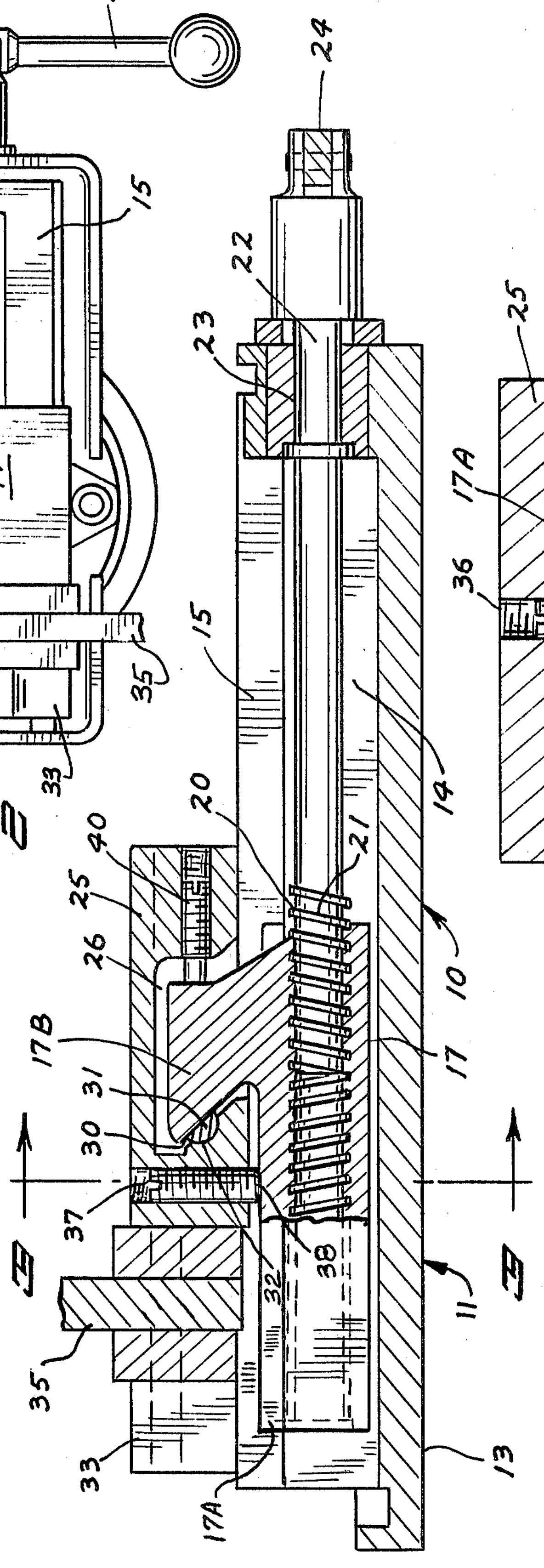
FIG. 2 is a sectional view taken as on line 2—2 in FIG. 1.
Figure 3:
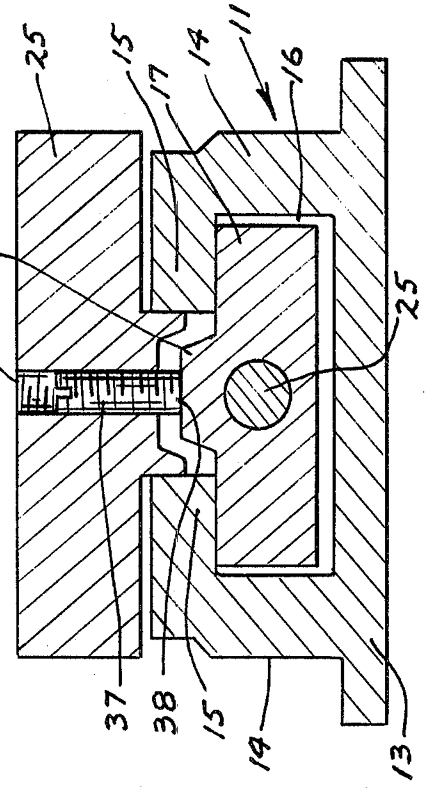
FIG. 3 is a sectional view taken as on line 3—3 in FIG. 2.

In some instances the clamping increases the drag and friction losses. The increased drag significantly reduces the percentage of the force from screw 22 that is available for a clamping force between the movable jaw and the stationary jaw. The amount of clamping force therefore that can be exerted onto a workpiece 35 that is shown in FIG. 2 is reduced from the amount that can be generated by operation of the screw 21.

In order to significantly reduce the loss of clamping force through friction and binding of the movable nut and movable jaw, a compression carrying stop screw is positioned to act between the movable jaw 25 and the forward portions of the nut 17 to react the vertical force (that is, forces generally perpendicular to the surfaces of the ways 15) and to prevent the nut 17 and jaw 25 from moving together more than a desired amount.

To accomplish this, the movable jaw has a threaded opening 36 defined therein overlying the boss 17A of the nut, as shown, and a set screw or adjustable member 37 is threaded in the opening 36. The screw 37 has a lower end indicated generally at 38 which engages the upper surface of the boss 17A of the nut. The minimum spacing between the upper surfaces of the nut, which are adjacent the undersurfaces of the ways 15, and the lower surfaces of the jaw 25, which act against the upper surfaces of the ways 15 is maintained thereby. The adjustable member 37 thus prevents the jaw and nut from clamping tightly onto the ways 15 and digging in or otherwise increasing greatly the amount of friction tending to prevent sliding of the jaw 25.

The screw or adjustable member, of course, can be located in different locations on the jaw and nut from the locations shown, as long as the adjustable member carries compressive forces and keeps the facing surfaces of the nut and the movable jaw at a known, spaced relationship that will prevent them from clamping down onto the ways 15.

Thus a very simple, low cost and easily manufactured compressive carrying member increases the ability of the device to clamp tightly without generating excessive frictional forces on the guideways.

It should also be noted that set screws 40 are provided at the rear portion of the movable jaw 25 and act against the rear surfaces of the upright portion 17B of the nut to keep the surfaces 30 and 32 urged toward each other so that the spherical washer 31 will continue to carry some load when the nut is being backed off.

I claim:

1. A vise comprising a frame, a fixed jaw, first means mounting said fixed vise jaw adjacent one portion of said frame, a movable jaw mounted on said frame for sliding movement toward and away from said fixed jaw, second means for moving said movable jaw comprising a shiftable nut mounted on said body for shifting movement relative to the fixed jaw, said frame having way means thereon for supporting said movable jaw, at least portions of said nut being mounted on the opposite side of said way means from portions of said jaw, said movable jaw nut transmitting forces to said jaw at a force angle so that the movable jaw and nut are both urged toward the way means as the nut is shifted, an actuating screw for engaging said nut for shifting the nut relative to the frame, and third means between said nut and said movable jaw to limit the amount that said movable jaw and nut can move toward each other in direction tending to clamp the opposite surface of the way means between the movable jaw and nut.

2. The combination of claim 1 wherein said last mentioned means comprises an adjustable compression carrying member.

3. The combination of claim 1 wherein the way means comprise a pair of spaced guide members, said third means comprising a compression carrying screw threadably mounted in one of said movable jaw and nut and bearing against the other of said movable jaw and nut, said screw passing through the space between said guide members.

4. The combination of claim 1 wherein said way means comprise wall members defining a first surface for slidably supporting said movable jaw and a second surface oppositely facing from the first surface, said nut being adjacent said oppositely facing surface, and said third means comprises an adjustable screw threadably mounted in said movable jaw and engaging said nut to prevent the movable jaw and nut from clamping against the respective surfaces of said wall member.

* * * * *